Figure 1:
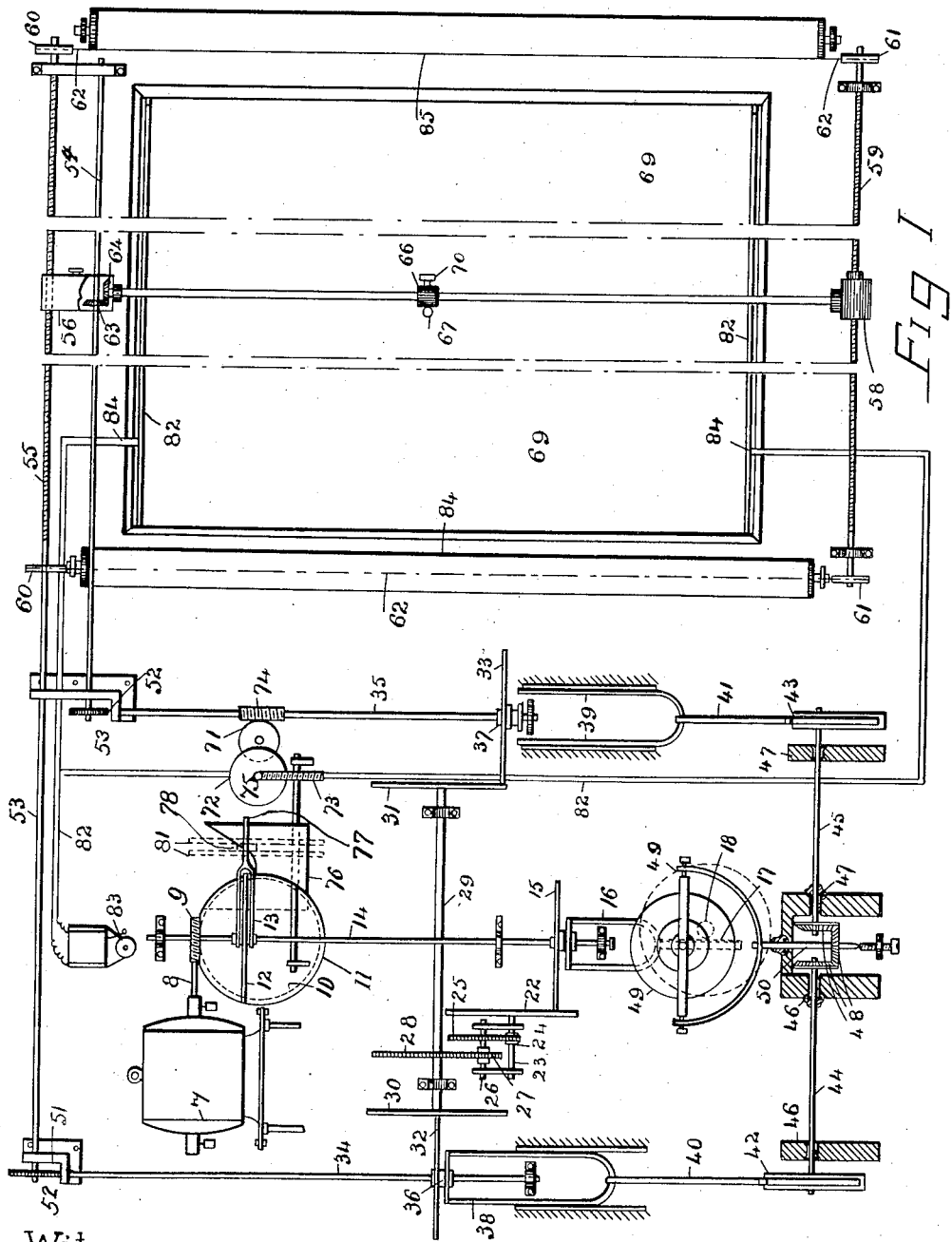

V. ROŽIĆ.
APPARATUS FOR INDICATING AND RECORDING THE COURSE OF NAVIGABLE VESSELS.
APPLICATION FILED FEB. 6, 1911.

1,062,929.

Patented May 27, 1913.

3 SHEETS—SHEET 1.

Witnesses

Inventor
Victor Rožić
By
Attorney

V. ROŽIĆ.
APPARATUS FOR INDICATING AND RECORDING THE COURSE OF NAVIGABLE VESSELS.
APPLICATION FILED FEB. 6, 1911.

1,062,929.

Patented May 27, 1913.

3 SHEETS—SHEET 2.

Witnesses
M. Hefling
Everett Lancaster

Inventor
Victor Rožić
By B. Singu
Attorney.

V. ROŽIĆ.
APPARATUS FOR INDICATING AND RECORDING THE COURSE OF NAVIGABLE VESSELS.
APPLICATION FILED FEB. 6, 1911.
1,062,929.
Patented May 27, 1913.
3 SHEETS—SHEET 3.
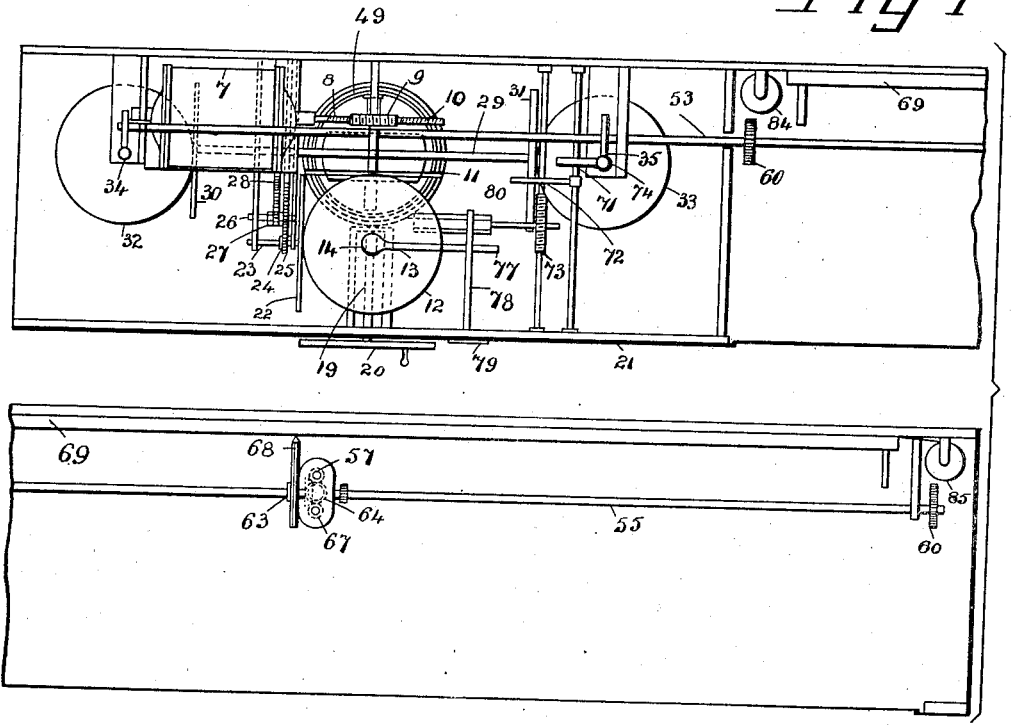
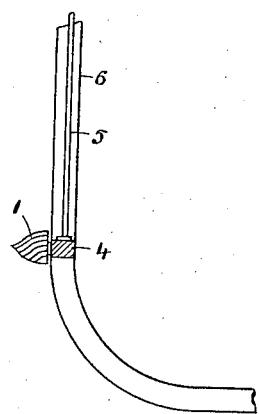
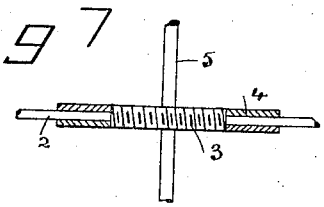
Witnesses
M. Hefling
Everett Lancaster
Inventor
Victor Rožić
By B. Singu
Attorney.

UNITED STATES PATENT OFFICE.

VICTOR ROŽIĆ, OF BAKAR, AUSTRIA-HUNGARY.

APPARATUS FOR INDICATING AND RECORDING THE COURSE OF NAVIGABLE VESSELS.

1,062,929.   Specification of Letters Patent.   Patented May 27, 1913.

Application filed February 6, 1911.   Serial No. 606,923.

*To all whom it may concern:*

Be it known that I, VICTOR ROŽIĆ, a subject of the Emperor of Austria-Hungary, residing at Bakar, Croatia, in the Empire of Austria-Hungary, cadet of the mercantile marine, have invented a new and useful Improvement in and Relating to Apparatus for Indicating and Recording the Course of Navigable Vessels, of which the following is a specification.

This invention relates to apparatus for indicating and recording the course of navigable vessels and, more particularly, to that type of apparatus which automatically registers the travel of a ship.

It is well known that ships and other navigable vessels are directed and guided on their course by means of a magnetic compass and repeated calculations as to the positions of any two astronomical bodies relative to the sextant, or between one such body and the horizon. From these observations and calculations the ship's true course or position is ascertained under normal conditions, but when the sky is clouded or fog is prevalent it naturally follows that the finding of the ship's true position becomes exceedingly difficult if not utterly impossible.

To overcome the foregoing disadvantage various electro-magnetic devices have been proposed and constructed with the main object of reducing the number of calculations necessary, as well as concurrently registering the ship's traveled way. Such apparatus, though comparatively simple in action, have more or less been dependent for success upon the ability of the navigating officer; or, in other words, they are non-automatic in action and require some calculations to be made.

The particular type of apparatus to which my present improvements relate is that in which two shafts coöperate with a marker in such a manner that one of said shafts actuates the marker when the course of the vessel is set to a northerly or to a southerly course, and the other shaft when the course of the vessel is set in an easterly or a westerly direction. To set the shafts according to the course of the vessel, a pair of stirrups are provided, pertaining respectively to the north and to the east shafts; and these stirrups are actuated respectively by levers arranged at right angles to each other so that as the course of the vessel is altered the stirrups are actuated to bring the one or the other shaft into operation. These shafts are driven by horizontal friction wheels supported upon the stirrups and bear against the faces of vertical friction wheels which are driven by one of a pair of synchronous electric motors, the horizontal friction wheels being respectively raised and lowered by means of the stirrups so that one is brought to the center of its vertical disk and thereby rendered inoperative while the other is brought to the periphery of the disk and thereby rendered operative. One of the said motors is connected to a hunting switch revolved by a "logship" towed astern of the vessel and so arranged as to drive the other motor proportionately to the speed of the vessel.

The object of my invention is to provide an improved and thoroughly reliable apparatus of the above type and one which shall be entirely automatic in action, and by means of which the geographical latitude and longitude can be ascertained at a glance from a chart upon which the record is depicted.

With the foregoing object in view my invention consists essentially in the novel construction, combination and arrangement of parts hereinafter fully described and specifically claimed.

In order that my invention may be fully understood and carried into practical effect I will now describe the same with reference to the accompanying drawings; in which—

Figures 2, 3:
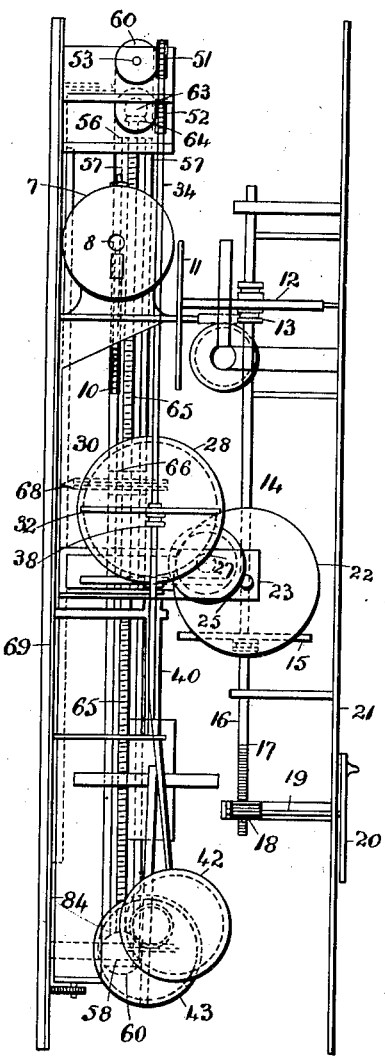

Figure 1 is a diagrammatic general elevation of my improved apparatus; Fig. 2 is an end elevation thereof looking from the left of Fig. 1; Fig. 3 is a similar end elevation looking from the right of Fig. 1; Fig. 4 is a top plan view of the same. Fig. 5 is a detail elevation of a preferred means for actuating the apparatus illustrated in the preceding figures; Figs. 6 and 7 are details hereinafter more specifically referred to.

In the following description and on the several drawings, like parts are designated by the same reference characters.

According to one way of carrying my invention into effect and as illustrated, the improved apparatus consists of two main parts, the receiver and the recorder respectively.

Briefly stated the receiver consists of a primary source of power and a make and break electric contact device, said primary source of power being referred to hereinafter as the rotator. The rotator consists of a somewhat cone-shaped propeller 1 (Fig. 5) which is rigidly secured upon the outer end of a shaft 2 (Figs. 6 and 7) mounted in appropriate bearings provided for the purpose in a transmission box formed in the stern of the ship or other navigable vessel to which my invention may be applied. This propeller 1 and transmission box are preferably arranged some distance below the low-water level mark of the ship, or, in other words, in such a position as to be well under water when said ship is drawing its lightest draft; or, it may be mounted in the forward part of the keel, or towed by the log-line. I prefer to fix the rotator on the ship's body and under the lowest water-line, or at the keel, and make it an integral part of the ship so that it shall follow her every movement be it ahead or astern or in any other direction as well as to eliminate the noisy hauling-in of the said rotator when towed by a log line astern of the vessel and the necessary care attendant thereupon.

The horizontal shaft or axis 2 of the rotator has formed integral therewith, or it may be secured thereon, an endless thread or helix 3 which in turn gears with a small worm wheel 4, keyed upon the lower end of a shaft 5 arranged in suitable bearings and disposed vertically of the ship's stem 6. This vertical shaft 5 is in turn geared in any of the well known ways, with any suitable make and break contact device adapted to work a motor 7 proportional to the speed of the vessel, or the shaft may be directly coupled in any suitable manner to the fundamental driving gear 10 so that the latter is driven directly at a speed proportional to the revolution of the rotator 1.

The recording part of my improved apparatus is arranged upon a bulk-head of the chart room and broadly consists also of two main parts, firstly, the mechanism, and, secondly, the chart frame proper. The means for moving the recorder in necessary directions over the chart is based upon the principle of the resultant of two rectangular components. The direction in which the recorder moves may be termed dual, for example, the north to south movement, and the east to west movement, said movement synchronizing harmoniously according to varying latitude. The principle again, upon which the harmonious variations of these two components are based, rests upon the directing action of a gyroscope which always maintains its axis parallel to itself. As regards the mechanism, I provide an electro-motor 7 identical in every respect with that fitted in connection with the receiver above described. The spindle or shaft 8 of this motor 7 has attached to its end remote from the brushes an endless thread or helix 9 which gears with a worm-wheel or fundamental tooth gear 10 to the spindle of which is keyed or otherwise secured a disk 11, hereinafter termed the fundamental disk. Arranged vertically or at right angles to, and in frictional contact with the fundamental disk 11, is the $\gamma$-disk 12, which is thus rotated or turned thereby. The $\gamma$-disk 12 is free to slide radially across the face of the fundamental disk 11, in a direction toward or away from the center and it is revolubly mounted between the prongs or arms of a horizontally disposed fork 13 which is under the control of a special regulator. This fork 13 is termed the $\gamma$-fork, and the regulator the $v$-regulator.

The axis or spindle 14 of the $\gamma$-disk is preferably square in cross section and upon it is adapted to slide the $\gamma$-disk, and at the lower end of said spindle 14 I mount the $v$-disk 15, which is identical in size and weight with the fundamental disk 11. This disk 15 is also carried in a fork or stirrup 16, arranged vertically and adapted for vertical movement, said stirrup being hereinafter designated the scale stirrup. Formed integral with or attached to the lower end of the scale stirrup 16 is a rack bar 17 with which gears a small toothed gear 18 fixed at one end of a spindle 19, the other end whereof is furnished with a disk 20 bearing a small handle, a zero mark and a number 1, for movement over the cover 21 of the apparatus, which is marked with a series of numerals corresponding with all forms of scales employed on nautical charts. These numbers are so arranged to form the second part of the scale, for example, for a scale 1 to 10,000, the necessary number and the mark 1 will be depicted upon the scale disk. and the numerals 10,000 upon the cover of the apparatus.

The $v$-disk 15 has arranged in frictional contact therewith, and at right angles thereto, another disk 22 hereinafter designated the $c$-disk, said disk being fixed upon one end of a spindle 23 to which is keyed or otherwise secured a toothed pinion 24 in turn meshing with a toothed wheel 25 fixed to an intermediate spindle 26. This spindle 26 also carries a second pinion 27 in gear with a toothed wheel 28 mounted upon a horizontally disposed shaft 29 hereinafter termed the $e$-shaft or axis. The $e$-shaft is mounted in suitable bearings and is provided at each end with vertically arranged disks 30, 31. In frictional contact with the disks 30, 31, respectively, are horizontal disks 32, 33, the former of which is designated the E—W and the latter the N—S disk, and said disks 32, 33, are slidably mounted upon vertically disposed square shafts or spindles 34—35.

The disks 32, 33, are carried by means of collars 36—37, connected to vertically movable stirrups 38—39, which slide vertically between two vertical guides, said stirrups being provided respectively with connecting or eccentric rods 40, 41, coupled in any of the well known ways to the eccentrics 42, 43.

The eccentrics 42, 43, are respectively fixed to the outer ends of shafts 44, 45, mounted in ball bearings 46, 47, and said shafts are connected together at their inner ends by miter gearing 48 in connection with a gyroscopic device 49, the supporting spindle or axis 50 whereof is vertically disposed and fixed to the connecting or medial wheel of the miter gearing 48, as clearly indicated in Fig. 1; furthermore, the eccentrics 42, 43, are arranged at an angle of 90° relative to each other so that when the rod 40 is lifted the other 41, is lowered and vice versa. These eccentrics are also arranged so that, when the ship lies in a northerly course, the E—W disk 32 is positioned centrally of its E—W auxiliary disk 30, while the N—S disk occupies a position near, or at, the periphery of the N—S auxiliary disk 31. The vertical shafts or spindles 34, 35, are furnished at their upper ends with miter gearing or endless threads and worm wheels 51, 52, respectively imparting motion to horizontally mounted shafts or spindles 53, 54.

For a considerable portion of the length of the E—W spindle 53, I form an endless thread or screw 55 that carries a traveling nut 56, which is connected by means of two vertically arranged rods 57, 57, to a second traveling nut 58 arranged to traverse a screwed spindle 59 mounted in bearings parallel with the spindle 53, but below the chart frame.

60, 60, 61, 61, are sprocket wheels keyed upon the spindles 53, 59, respectively, which coöperate with roller chains 62, 62, whereby whatever motion is imparted to the said upper spindle 53 is correspondingly transmitted to the lower one 59.

The N—S spindle 54 is preferably square in cross-section and has slidably mounted thereon a miter-wheel 63 gearing with a similar wheel 64 which is supported in a collar fixed to the traveling nut 56 on the E—W spindle 53. To the lower end of the nut 56 are secured the two vertical parallel rods 57, 57, which are similarly connected to the lower traveling nut 58.

Centrally between the two rods 57, 57, I revolubly mount an endless screw 65 upon which the recorder nut is adapted to travel, said nut being coöperatively and slidably connected to the rods 57, 57, to prevent its revolution but insure its vertical movement.

On the left hand side of the recorder nut 66 is fixed a c-formed spring 67 to which is secured the pencil or like point 68 for marking the ship's traveled way upon the chart 69, and I preferably make the nut 66 in two inter-registering parts which are clamped together by means of a thumb-screw 70, for convenience in attachment and detachment.

The upper traveling nut 56 is also made in two halves coupled together in any convenient manner, and the upper end of the endless screw 65—hereinafter termed the meridian-screw—has secured thereon the miter-wheel 64 above referred to as being carried by the collar in the traveling nut 56, and hereafter referred to as the meridian-coupling.

In the recorder mechanism and between the first pair of disks 11, 12, is arranged the scale-fork 13 which is moved by the v-regulator, consisting of the v-machinery, v-screw and the Mercator curve of latitude, a pair of v-guides, the f-index and the scale of latitudes.

The v-machinery comprises three toothed wheels 71, 72 and 73 and two endless screws 74, 75, one of which, 74, is keyed to or formed upon the spindle 35 of the N—S disk 33. The number of teeth are so calculated that the several parts are moved in directly proportional ratios, and the last toothed wheel spindle carries an endless thread 75 which gears with the worm wheel 73, whose spindle again is screw threaded and horizontally disposed and actuates a nut fixed at the base of the Mercator curve 76, and which is termed the v-screw.

The Mercator curve 76 is preferably made of steel in the following manner:—The basis of the curve is the axis upon which abscissæ are measured from 75° south to 80° north latitude. Upon the axis of the abscissæ, that is, the basis of the curve, are elevated the respective ordinates of the Mercator's increasing latitudes. The ends of these ordinates connected together will give as result a curve similar to a hyperbole, which is worked out with the greatest care and made from the best hard polished steel. An arm 77 from the γ-fork 13 carries a transverse rod 78 having on its outer end an index 79 and at its inner end a small hard steel roller 80. This roller 80 slides upon the inner side of the Mercator curve and serves to facilitate the movement of the rod 78 on the curve and thereby raises or lowers the γ-fork 13. The γ-index 79 moves over a vertically arranged scale upon which is marked every degree of latitude from 0° to 80°. The nut fixed to the base of the Mercator curve is split and its parts are bound rigidly together by a thumbscrew so that said curve may be easily attached without interfering with the entire mechanism, and 81 are the v-guides or a pair of runners which guide the fork 13 vertically while at the same time insuring its remaining always in a horizontal plane.

Extending transversely between the side frames of the recording chart 69 are arranged parallel uninsulated electric wires 82, 82, which are spread so as to pass between the two rods 57. These wires are so disposed as to constitute an obstacle to the recorder's nut 66 on the upper and on the lower side of the chart frame, and are in circuit with an audible signal such as an alarm bell 83 in connection with a battery—not shown. It will be noticed that the wires 82, 82, are vertically turned up and down at 84 so that they constitute two stops lying in the path of the meridian screw 64 so that the traveling nuts 56, 56, when in contact therewith close the circuit through the screw 64 to the bell 83 and cause it to ring.

The gyroscopic device 49 is electrically operated and all the various disks are preferably made of the best steel and the entire apparatus may be made in various sizes while the chart 69 can be arranged to be unwound from one vertical roller 84 on to another 85, or vice versa, said arrangement of parts facilitating work upon charts of different lengths.

The number of toothed wheels between the c-disk 22 and the e-wheel 28, as well as between the v-screw 74, may be modified in accordance with the number of revolutions required from the e-wheel and v-screw. Furthermore, I wish it to be clearly understood that the form described is by way of example only as the details of construction may obviously be varied without in any way departing from the essential features of my invention.

The operation of the improved apparatus is briefly as follows:—When the ship or other vessel moves ahead or astern the rotator 1 begins to revolve and by its movements closes a series of contacts in the contactor. The motors of the contact breaker and that (7) of the recorder (being identical three-phase synchronous motors) are thereby started to rotate with a speed directly proportional to the speed of the rotator 1, which in turn is directly proportional to the speed of the ship. The motor 7 of the recording device drives the fundamental disk 11 by means of the endless screw 10 and said disk drives by friction the γ-disk 12, and by means of the spindle 14 of the v-disk 15 is revolved therewith. In like manner the v-disk 15 drives by friction the c-disk 22 with a speed varying proportionally to the distance the said disk 15 is removed from or adjacent to the center of the disk 22. The c-disk 22 having upon its spindle 23 the toothed gear 24 in gear with the train of e-wheels 25—28 and thereby operates the auxiliary E—W and N—S disks 30, 31, respectively, said disks in turn frictionally driving the sliding E—W and N—S disks which are raised and lowered by means of the eccentrics 42, 43 upon the gyroscopic device operating shaft 44.

The E—W and N—S disks operate the upper and lower parallel shafts 53, 54 through the gearing hereinbefore described the former shaft by means of the threaded portion 55 moving the nut 56 toward the right or left hand, that is to say, toward the east or toward the west according to which direction the spindle 53 is rotated or, according to the position of the E—W disk 32 relative to its auxiliary disk 30 either above or below the center thereof. The lower spindle 54 will drive the meridian screw 65 through its gearing whereupon the recording nut 66 will be vertically raised or lowered according to the direction of rotation of the N—S disk 33. By the combination of these two movements the recorder pencil 68 will be advanced or propelled so as to travel in every possible direction and indicate every variation upon the chart 69, said variations and changes being automatically felt and registered by the gyroscope.

As instances of the working of my improved apparatus I now give a few examples:—

1. Assuming the ship lies in a northerly course and is going ahead, the scale of the chart any desired one, and the latitude, for example, north; the N—S disk 33 will be near the periphery of the auxiliary disk 31 as shown in Fig. 1 while the E—W disk 32 will be on the center of its auxiliary 30. The E—W nut 56 together with the spindles 53, 59, will be at rest while the meridian screw 64 is rotated and the recorder nut 66 traveled upwardly, or the course of the recorder is due north.

2. The ship passes into the first quadrant. The gyroscopic device 49 being electrically driven remains in its primitive position relatively toward the horizon, and so moves by means of the eccentrics 42, 43, and forks 38, 39, the E—W disks 32 toward the periphery, and the N—S disk 33 toward the center of the auxiliary disks 30, 31, respectively. The E—W disk 32 when moved away from the center of the disk 30 begins to revolve and through its gearing moves the nut 56 toward the right or east side of the recorder. The N—S disk 33 will begin to decrease its speed and thereby relatively reduce the travel of the nut 66, and with the combination of these two movements the recorder has imparted thereto a third motion in the ship's course, that is to say, in the first quadrant.

3. When the ship heads eastward, the gyroscope 49 moves the E—W disk 32 toward the periphery of its auxiliary and the N—S disk 33 moves toward the center of its auxiliary 31, thereby reducing its speed, whereupon the N—S nut 66 is brought to rest and the nut 56 attains its maximum speed, and the recorder is then in the due east course.

4. If the ship passing from east always moves toward the south, the N—S disk 33 is moved downwardly past the center of its auxiliary 31 and toward the periphery thereof, said movement causing a reversal of its direction of rotation, whereupon the nut 66 is moved downwardly toward the south; its rate of travel varying according to the amount of deflection from due south when it attains its maximum speed. In this way the recorder is traveled in the second quadrant.

When the ship is traveling due south the E—W disk 32 is at the center of its auxiliary 30, and the N—S disk 33 at the lower periphery of the disk 31, or, in other words, the speed of the E—W disk is reduced to zero.

From the foregoing it will be seen that the improved apparatus automatically records the ship's course quite independently of the magnetic compass and its variations. Supposing now that the ship comes finally back into a northerly course and remains in it proceeding continually toward the north, the $\triangle$—$\gamma$ increases, whereas the $\lambda$ remains the same. In this instance only the N—S spindle 35 and with it the meridian screw 64 be in operation while the entire E—W mechanism will be at rest. As a result of the revolution of the spindle 35 the $v$-wheels and the $v$-screw will be operated and the $v$-nut moved to the right or left hand according as the ship is in the north or south hemisphere. This $v$-nut being secured to the curve of increasing latitudes or the Mercator's curve 76 it will be moved in a similar horizontal direction, for example, to the left-hand. The curve 76 will thus raise the transverse bolt or rod 78 which moves the $\gamma$-fork 13 vertically, and said fork 13 thereby elevates the $\gamma$-disk 12, which movement toward the periphery of the disk 11 increasing its speed, as well as that of the entire mechanism, whereupon the $\triangle$—$\gamma$ increases according to the latitude. This increase of speed is in every case proportional to the distance of the $v$-disk 12 from the center of the fundamental disk 11, this distance being again determined by the height of the ordinate of the Mercator's curve which is at this moment under the transverse bolt 78; or, in other terms, directly proportional to these ordinates or to the increased latitude $\triangle$—$v$.

When the recorder nut 66 reaches the end of the chart, the circuit to the alarm bell 83 will be closed and a signal given that the chart must be changed. If the new chart is of a different scale to that removed the scale disk must be correspondingly moved toward the center or toward the periphery of the $c$-disk 22, the speed of the $e$-disks will be proportionally increased or diminished and must be constant for charts of identical scale.

What I claim as my invention and desire to secure by Letters Patent is:—

1. A nautical apparatus comprising in combination, a chart, a marker for indicating on the chart the direction or course of the vessel with respect to the points of the compass, coacting devices for advancing the marker on the chart in any direction corresponding to the course of the vessel and each device having an adjustable friction wheel, fundamental means adapted to be driven at a speed corresponding to the speed of the vessel and having friction wheels engaging and driving the adjustable wheels of said devices, and gyroscopic mechanism for adjusting the wheels of said devices with respect to the wheels of said fundamental means for varying the action of the marker, substantially as described.

2. A nautical apparatus comprising in combination, a chart, a marker for indicating on the chart the direction or course of the vessel with respect to the points of the compass, coacting devices for moving the marker on the chart in any direction corresponding to any direction of movement of the vessel, a fundamental wheel adapted to be driven at a rate of speed corresponding to the speed of the vessel, a friction wheel driven by the fundamental wheel, a Mercator curve mechanism driven by one of said marker actuating devices for adjusting said friction wheel with respect to said fundamental wheel to alternate speed of the former, driving connection means between said friction and said coacting devices, and gyroscopic mechanism for altering the speed of said devices with respect to each other, substantially as described.

3. A nautical apparatus comprising in combination, a chart, a marker for indicating on the chart the direction or course of the vessel with respect to the points of the compass, coacting devices for moving the marker on the chart in a direction corresponding to any direction of movement of the vessel, fundamental mechanism having a chain speed device connected to drive said coacting devices and itself adapted to be driven at a rate of speed corresponding to the speed of the vessel, Mercator curve mechanism driven by one of said coacting devices for operating said chain speed device, a gyroscopic mechanism for altering the speed of said coacting devices with respect to each other, substantially as described.

4. A nautical apparatus comprising in combination, a chart, a marker for indicating on the chart the direction or course of the vessel with respect to the points of the compass, coacting devices for moving the marker on the chart in any direction corresponding to any direction of movement of the vessel, fundamental mechanism connected to drive said coacting devices and having a chain speed device whereby the rate of speed of drive imparted to said coacting devices may be varied, and gyroscopic mechanism for altering the individual speed of said coacting devices with respect to each other, substantially as described.

In witness whereof I have hereunto set my hand in the presence of two witnesses.

VICTOR ROŽIĆ.

Witnesses:
 BOLIVER STORY,
 VITTORIO RACCANELL.